(12) United States Patent
Zhou et al.

(10) Patent No.: US 12,488,600 B2
(45) Date of Patent: Dec. 2, 2025

(54) METHOD OF DETERMINING DEGREE OF CONGESTION OF COMPARTMENT, ELECTRONIC DEVICE AND STORAGE MEDIUM

(71) Applicant: HON HAI PRECISION INDUSTRY CO., LTD., New Taipei (TW)

(72) Inventors: Yu-Kai Zhou, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 445 days.

(21) Appl. No.: 18/144,769

(22) Filed: May 8, 2023

(65) Prior Publication Data

US 2024/0177502 A1 May 30, 2024

(30) Foreign Application Priority Data

Nov. 30, 2022 (CN) .......................... 202211529899.7

(51) Int. Cl.
*G06V 20/59* (2022.01)
*G06V 10/46* (2022.01)
(Continued)

(52) U.S. Cl.
CPC .......... *G06V 20/593* (2022.01); *G06V 10/467* (2022.01); *G06V 10/751* (2022.01); *G06V 40/10* (2022.01)

(58) Field of Classification Search
CPC .... G06V 20/593; G06V 10/467; G06V 40/10; G06V 10/751; G06V 20/59
See application file for complete search history.

(56) References Cited

U.S. PATENT DOCUMENTS

| | | | |
|---|---|---|---|
| 11,631,259 B2* | 4/2023 | Burzo | G06V 20/593 |
| | | | 382/103 |
| 2022/0391717 A1* | 12/2022 | Liu | G06N 20/00 |

(Continued)

FOREIGN PATENT DOCUMENTS

| | | |
|---|---|---|
| CN | 105564461 | 5/2016 |
| CN | 113505671 | 10/2021 |

(Continued)

*Primary Examiner* — Shaghayegh Azima
(74) *Attorney, Agent, or Firm* — ScienBiziP, P.C.

(57) ABSTRACT

A method of determining a congestion degree of a compartment applied to an electronic device is provided. The electronic device determines a remaining carrying space of the compartment according to a binarized passenger distribution image of the compartment. A predicted remaining number of passengers that can be carried in the compartment is determined according to the remaining carrying space. The electronic device determines a recommended remaining number of passengers that can be carried in the compartment based on a number of passengers currently in the compartment, the predicted remaining number of passengers, and a maximum number of passengers that can be carried in the compartment. The electronic device can determine the degree of congestion of the compartment according to the recommended remaining number of passengers that can be carried in the compartment and the maximum number of passengers that can be carried in the compartment.

17 Claims, 6 Drawing Sheets

(51) Int. Cl.
*G06V 10/75* (2022.01)
*G06V 40/10* (2022.01)

(56) References Cited

U.S. PATENT DOCUMENTS

2023/0110200 A1* 4/2023 Uchiyama .......... G06Q 30/0242
                                                705/14.68
2023/0196221 A1* 6/2023 Kuwahara ........ G06Q 10/06312
                                                705/7.12

FOREIGN PATENT DOCUMENTS

CN      113505671 A  * 10/2021
EP        4332626 A1 *  3/2024   ........... G01S 13/867

* cited by examiner

METHOD OF DETERMINING DEGREE OF CONGESTION OF COMPARTMENT, ELECTRONIC DEVICE AND STORAGE MEDIUM

FIELD

The present disclosure relates to the technical field of public transportation, in particular to a method of determining a degree of congestion of a compartment, an electronic device, and a storage medium.

BACKGROUND

When a passenger takes a public transportation (such as a subway), it is usually impossible to know in advance a degree of congestion in each compartment of a transportation. The passenger usually needs to choose a certain compartment to wait in line according to his own riding experience. It often happens that the passenger fails to take the transportation due to too crowded in the certain compartment. Therefore, the passenger needs to spend time waiting for a next transportation. Such a way of taking the transportation is too random, and not efficient.

DETAILED DESCRIPTION

In order to more clearly understand the above objects, features and advantages of the present application, the present application will be described in detail below in conjunction with the accompanying drawings and specific embodiments. It should be noted that, in the case of no conflict, the embodiments of the present application and the features in the embodiments can be combined with each other.

A lot of specific details are set forth in the following description to facilitate a full understanding of the application, and the described embodiments are only a part of the embodiments of the application, rather than all the embodiments. Based on the embodiments in this application, all other embodiments obtained by persons of ordinary skill in the art without making creative efforts belong to the scope of protection of this application.

Unless otherwise defined, all technical and scientific terms used herein have the same meaning as commonly understood by one of ordinary skill in the technical field to which this application belongs. The terms used herein in the specification of the application are only for the purpose of describing specific embodiments, and are not intended to limit the application.

In one embodiment, when a passenger takes a public transportation (such as a subway), it is usually impossible to know in advance a degree of congestion (a degree of congestion can be referred to as "congestion degree") in each compartment of a transportation. The passenger usually needs to choose a certain compartment to wait in line according to his own riding experience. It often happens that the passenger fails to take the transportation due to too crowded in the certain compartment. Therefore, the passenger needs to spend time waiting for a next transportation.

In order to solve the above problems, the method for determining a degree of congestion of a compartment provided by the embodiment of the present application determines a remaining carrying space of the compartment according to a passenger distribution image of the compartment, and determines the maximum number of passengers according to the remaining carrying space, the number of passengers already carried in the carriage, and the maximum number of passengers in the carriage. The method recommends a remaining capacity and determine how crowded the compartment is. The method can save passengers' waiting time by determining the degree of congestion in each compartment of the vehicle and recommends a compartment with a lower degree of congestion for passengers, effectively improve travel efficiency and effectively reduce potential safety hazards caused by overcrowded passengers.

Figure 1:
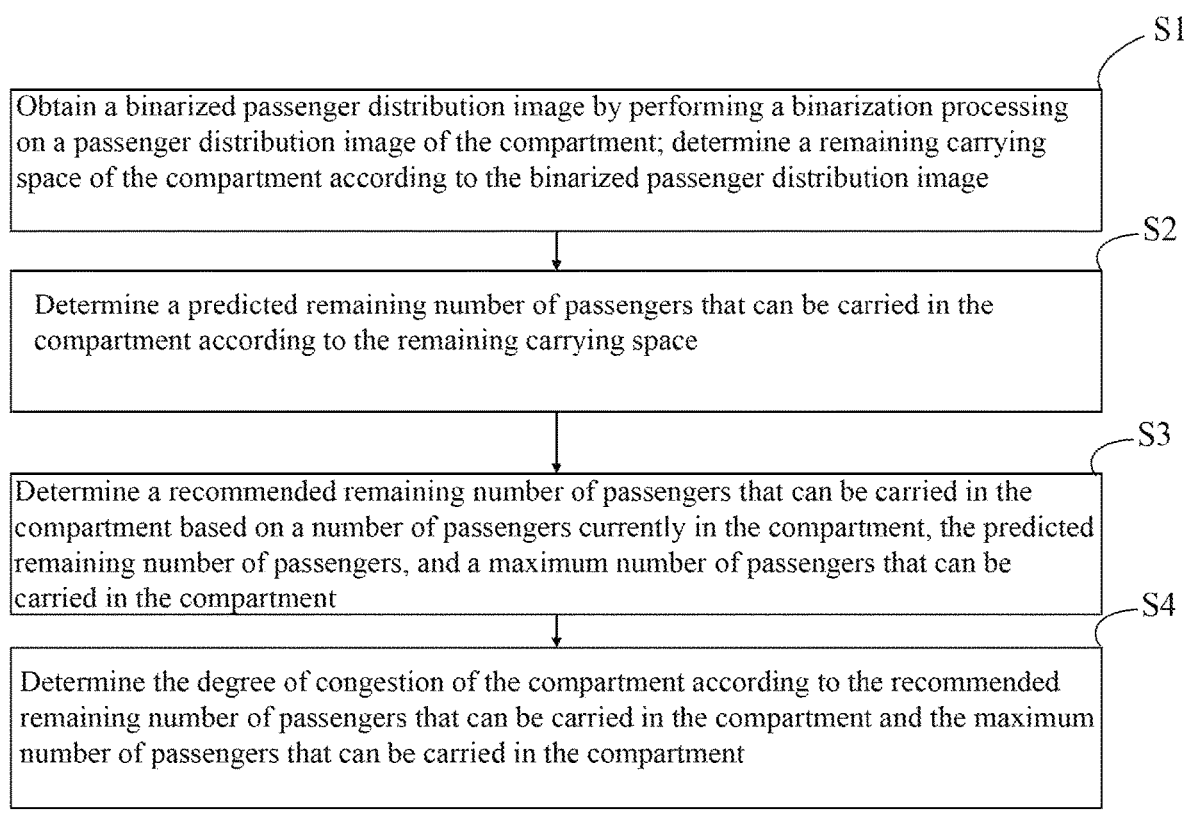
FIG. 1 is a flow chart of a method of determining a degree of congestion of a compartment provided by an embodiment of the present application.

Referring to FIG. 1, it is a flow chart of a method for determining a degree of congestion of a compartment in one embodiment of the present application.

Figure 10:
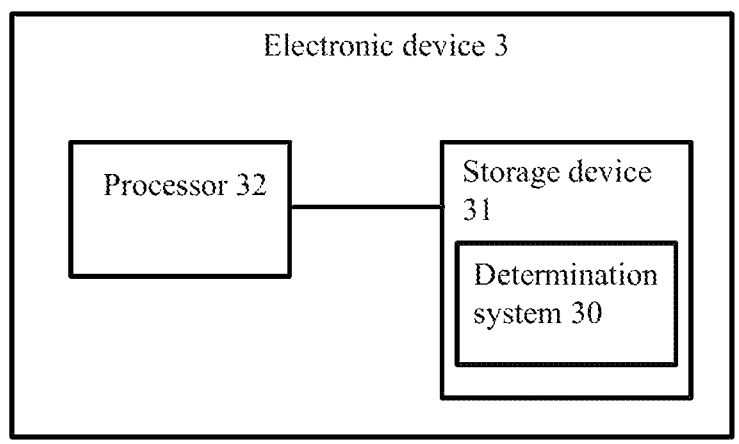
FIG. 10 is a structural diagram of an electronic device provided by an embodiment of the present application.

In this embodiment, the method for determining the degree of congestion in the compartment may be applied to an electronic device (such as the electronic device 3 as shown in FIG. 10), and the electronic device may be a vehicle-mounted device installed in a vehicle. For a vehicle that needs to determine a degree of congestion in a compartment of the vehicle, the electronic device installed in the compartment of the vehicle can directly integrate the function of determining the degree of congestion in the compartment provided by the method of the embodiment of the present application, or the function can be realized by using a software development kit (SDK) runs on the electronic device installed in vehicle.

As shown in FIG. 1, the method for determining the degree of congestion in the compartment specifically includes the following blocks. According to different requirements, an order of the blocks in the flow chart can be changed, and some blocks can be omitted.

Block S1, the electronic device obtains a binarized passenger distribution image by performing a binarization processing on a passenger distribution image of a compartment, and determines a remaining carrying space of the compartment according to the binarized passenger distribution image.

In one embodiment, the electronic device acquires an infrared thermal image of the compartment by using an infrared thermal imaging method, and using the infrared thermal image as the passenger distribution image of the compartment.

The infrared thermal imaging method is a passive infrared night vision technology. The principle of the infrared thermal imaging method includes: since an object with a temperature higher than absolute zero (−273 degrees Celsius) in nature radiates infrared rays all the time, at the same time the radiated infrared rays carry characteristic information of the object, so an infrared technology can be used to judge a temperature and a heat distribution field of the object.

Specifically, the electronic device detects an infrared radiation of an object by using an infrared detector in an infrared imaging device, converts a power signal of the infrared radiation into an electrical signal by using an infrared core in the infrared imaging device, and obtains the infrared thermal image corresponding to a thermal distribution on a surface of the object by converting the electrical signal into an image signal using a preset software of the infrared imaging device.

In one embodiment, the vehicle (such as a subway) includes a plurality of compartments, and each of the plurality of compartments installs at least one infrared imaging device, and the electronic device can obtain the infrared thermal image of a scene inside the corresponding compartment using the infrared imaging device. For example, the infrared imaging device can be installed at a center of a top of the compartment, and the infrared imaging device can be used to obtain a global infrared thermal image of the compartment.

Figure 2:
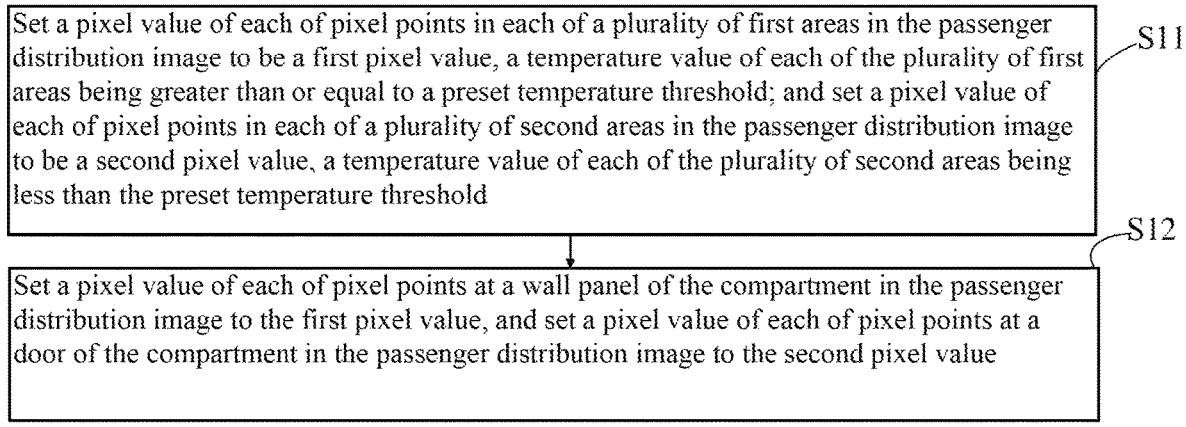
FIG. 2 is a flow chart of a method of performing a binarization processing on a passenger distribution image of a compartment provided by an embodiment of the present application.

In one embodiment, as shown in FIG. 2, it is a flow chart for performing a binarization processing on the passenger distribution image of the compartment provided by the embodiment of the present application, which specifically includes the following process:

Block S11, the electronic device sets a pixel value of each of pixel points in each of a plurality of first areas in the passenger distribution image to be a first pixel value, a temperature value of each of the plurality of first areas is greater than or equal to a preset threshold (hereinafter "temperature threshold"). The electronic device further sets a pixel value of each of pixel points in each of a plurality of second areas in the passenger distribution image to be a second pixel value, a temperature value of each of the plurality of second areas is less than the preset temperature threshold.

In one embodiment, since a body temperature of a human body in the compartment is different from that of other objects, the electronic device can determine an area indicated by the body temperature of the human body in the passenger distribution image as a distribution area of the passengers, i.e., the first area. Therefore, the preset temperature threshold can be set according to the body temperature of the human body, for example, the temperature threshold may be set to 36 degrees Celsius. Then, the plurality of first areas in the passenger distribution image are areas occupied by passengers, and the plurality of second areas in the passenger distribution image are areas not occupied by passengers.

In one embodiment, the first pixel value and the second pixel value can be set as required, for example, the first pixel value is set to 0 (black), and the second pixel value is set to 255 (white).

Figure 3:
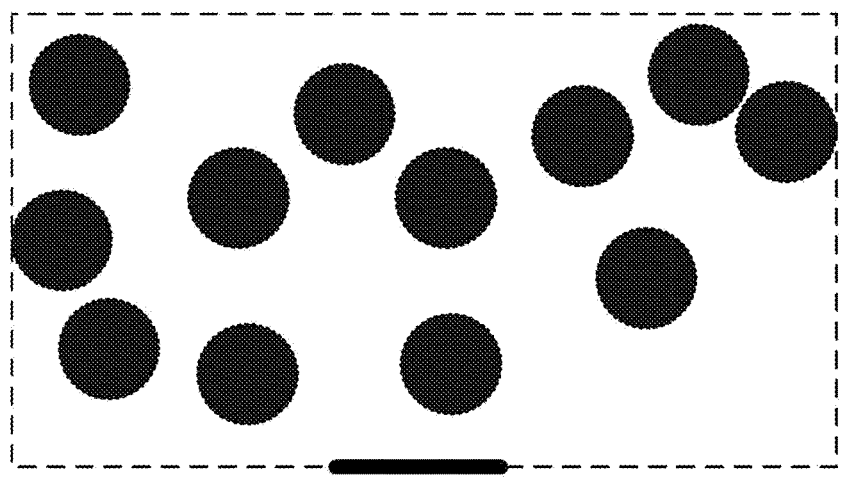
FIG. 3 is a first example diagram of a binarized passenger distribution image provided by an embodiment of the present application.

For example, as shown in FIG. 3, it is a first example diagram of the binarized passenger distribution image provided by the embodiment of the present application. In FIG. 2, a dotted rectangular frame represents a wall panel of a compartment, a black line in the dotted rectangular frame represents a door of the compartment, and a plurality of circular black areas inside the dotted rectangular frame represents areas occupied by passengers, a pixel value of each of pixel points in each of the plurality of circular black areas is set to the first pixel value.

Block S12, the electronic device sets a pixel value of each of pixel points at the wall panel of the compartment in the passenger distribution image to the first pixel value, and sets a pixel value of each of pixel points at the door of the compartment in the passenger distribution image to the second pixel value.

In one embodiment, the wall panel of the compartment is located at an edge of the compartment and belongs to a surrounding closed and fixed area, so the pixel value of each of pixel points at the wall panel of the compartment can be set as the first pixel value, which is equivalent to the area already occupied by passengers. The door of the compartment is an open area, and passengers need to enter and exit through the door, and when a new passenger enters through the door, passengers originally near and inside the door generally be pushed and automatically move to an interior of the compartment and away from the door, so the pixel value of each of pixel points at the door can be set to the second pixel value, to indicate an area not occupied by passengers.

Figure 4:
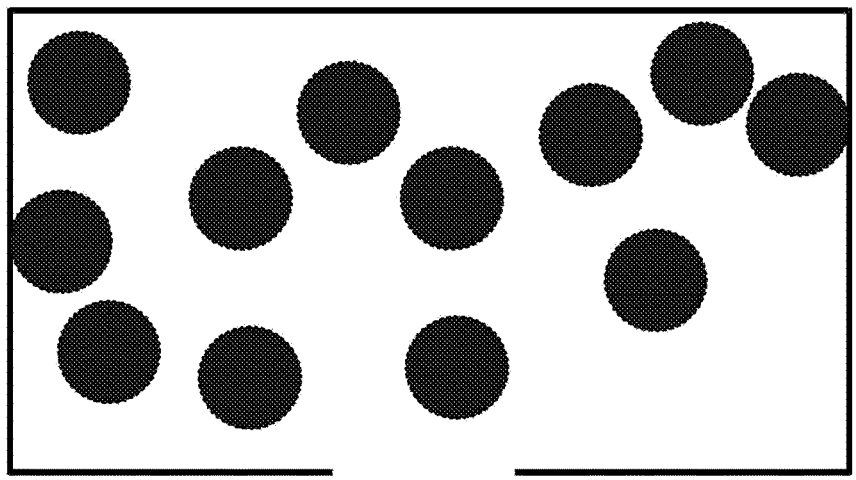
FIG. 4 is a second example diagram of a binarized passenger distribution image provided by the embodiment of the present application.

For example, as shown in FIG. 4, it is a second example diagram of the binarized passenger distribution image provided in the embodiment of the present application. In FIG. 4, the pixel value of each of pixel points at the wall panel of the compartment shown in FIG. 3 is set to the first pixel value, and the pixel value of each of pixel points at the door of the compartment shown in FIG. 3 is set to the second pixel value.

Figure 5:
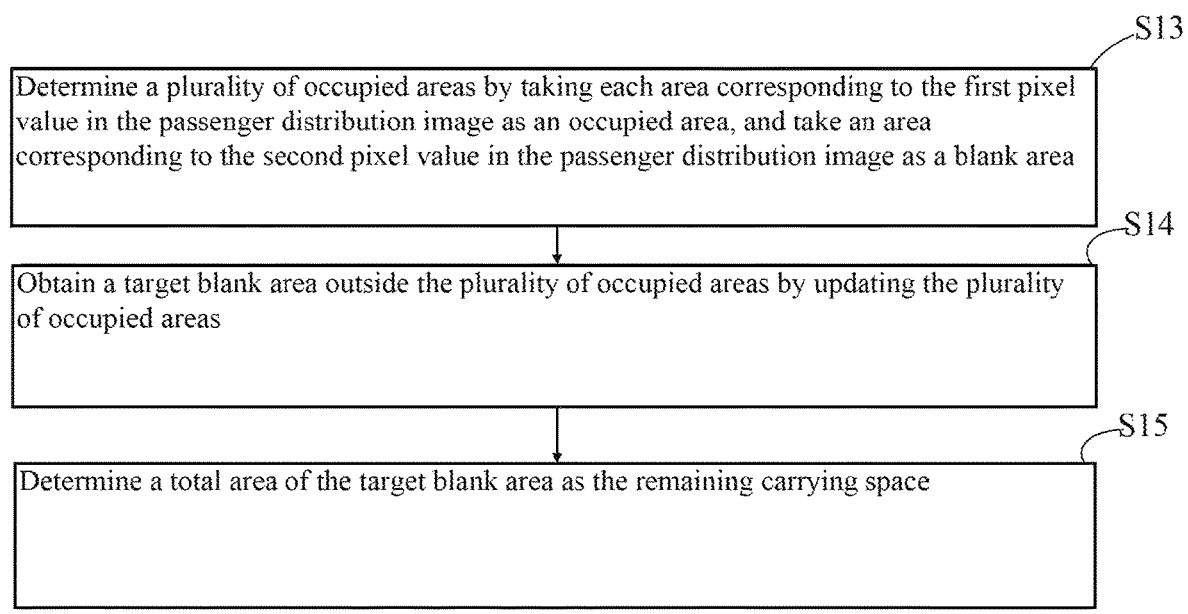
FIG. 5 is a flow chart of determining a remaining carrying space of the compartment provided by the embodiment of the present application.

In one embodiment, as shown in FIG. 5, it is a flow chart for determining the remaining carrying space of the compartment provided in the embodiment of the present application, and the remaining carrying space of the compartment determined according to the binarized passenger distribution image includes the following processes:

Block S13, the electronic device determines a plurality of occupied areas by takes each area corresponding to the first pixel value in the passenger distribution image as an occupied area, and taking an area corresponding to the second pixel value in the passenger distribution image as a blank area.

In one embodiment, referring to the description of block S11 to block S12, the electronic device takes the area where the first pixel value is located as the occupied area, and takes the area where the second pixel value is located as the blank area. The occupied area indicates an area being occupied and the blank area indicates an area not being unoccupied.

Block S14, the electronic device obtains a target blank area outside the plurality of occupied areas by updating the plurality of occupied areas according to a preset rule.

Figure 6:
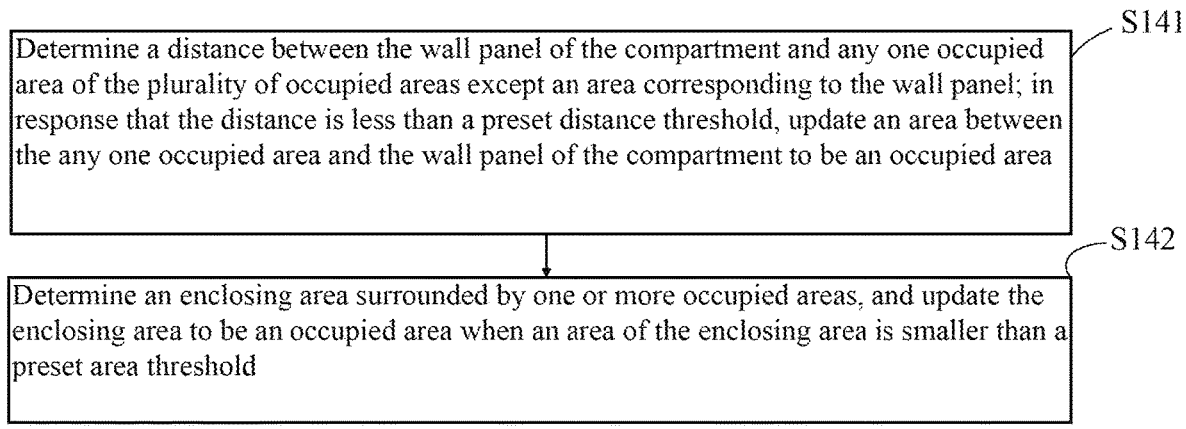
FIG. 6 is a flow chart of updating an occupied area provided by the embodiment of the present application.

In one embodiment, as shown in FIG. 6, the flow chart for updating the occupied area provided by the embodiment of the present application specifically includes the following process:

Block S141, the electronic device determines a distance between the wall panel of the compartment and any one occupied area of the plurality of occupied areas except the area corresponding to the wall panel. If the distance is less than a preset threshold (hereinafter referred to as "distance threshold"), the electronic device updates an area between the any one occupied area and the wall panel of the compartment to be an occupied area.

In one embodiment, the distance between the wall panel of the compartment and the any one occupied area is a shortest distance between the wall panel of the compartment and the any one occupied area.

In one embodiment, the electronic device determines the distance between the wall panel and the any one occupied area by: taking a lower left corner of the binarized passenger distribution image (such as FIG. 4) as a coordinate origin O of a Cartesian coordinates system XOY (such as FIG. 7), taking a long side of the binarized passenger distribution image as a horizontal axis X of the Cartesian coordinate system, and taking a short side of the binarized passenger distribution image as a vertical axis Y of the Cartesian coordinate system, taking a size of each pixel point as a unit length, and determining a number of pixel points between the wall panel and the any one occupied area as the distance based on the Cartesian coordinate system.

Figure 7:
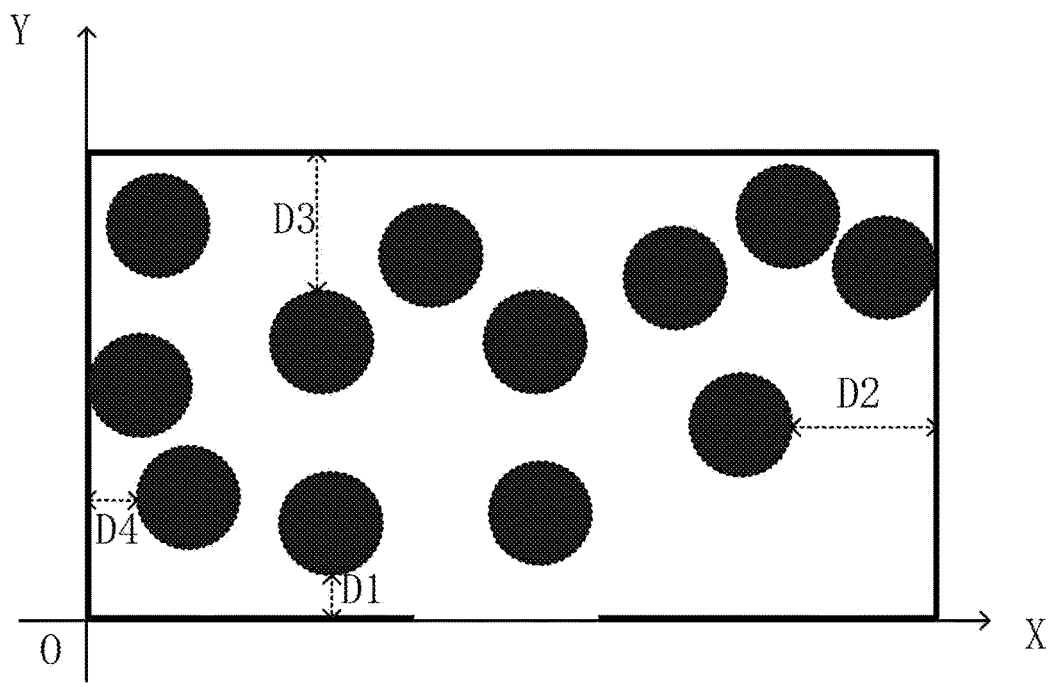
FIG. 7 is an example diagram of a distance between a wall panel of the compartment and an occupied area provided by the embodiment of the present application.

In one embodiment, as shown in FIG. 7, it is an example diagram of the distance between the wall panel and the any one occupied area provided in the embodiment of the present application. Among them, the Cartesian coordinate system XOY established on the basis of FIG. 4 (i.e., based on the binarized passenger distribution image) is shown in FIG. 7, and an example of the distance between the wall panel and each of four occupied areas is D1, D2, D3, D4 as shown in FIG. 7.

In one embodiment, when a new passenger enters the compartment, the passenger innermost close to the wall panel generally not moves. Therefore, if the distance is less than the preset distance threshold, the electronic device determines that the passenger corresponding to the distance is already very close to the wall panel, and then the electronic device can update an area between the occupied area corresponding to the distance and the wall panel to be an occupied area.

In an embodiment, the distance threshold can be set according to a size of an occupied area occupied by passengers, and can be set as one third or a half of a diameter (or length, width) of the occupied area occupied by passengers. For example, if an average diameter of the plurality of circular occupied areas in FIG. 4 equals 30 pixel points, then the distance threshold may be set to 30×⅓, that is, the distance threshold may be set to 10 pixel points.

Figure 8:
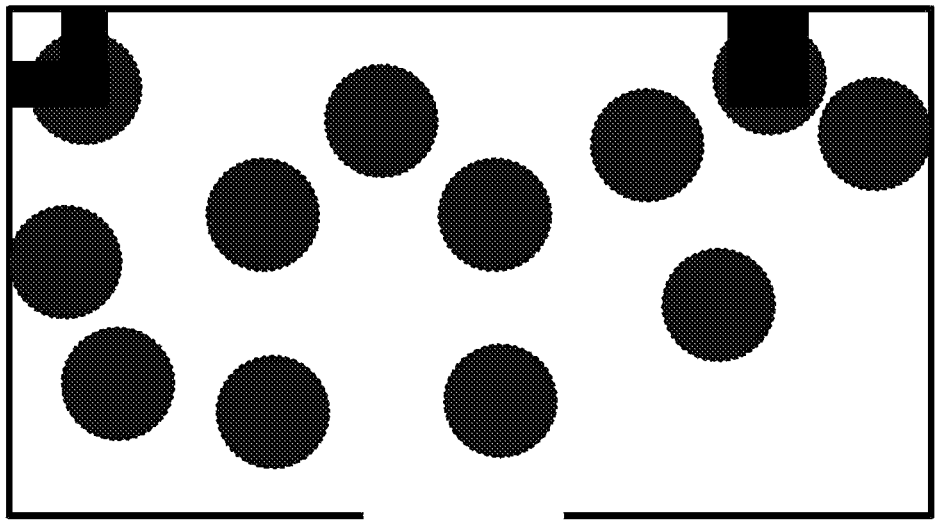
FIG. 8 is a diagram of a first example of updating an occupied area provided by an embodiment of the present application.

In an embodiment, as shown in FIG. 8, it is a first example diagram of updating an area to be an occupied area provided in the embodiment of the present application. On the basis of FIG. 4, the updated occupied areas are shown in an upper left corner and an upper right corner of FIG. 8.

Block S142, the electronic device determines an enclosing area surrounded by one or more occupied areas, and updates the enclosing area to be an occupied area when an area of the enclosing area is smaller than a preset threshold (hereinafter "area threshold").

In one embodiment, the electronic device determines the enclosing area by: determining a closed contour composed of first pixel values using an image recognition algorithm, and taking an area within the closed contour as the enclosing area. In one embodiment, the electronic device determines the area of the enclosing area by counting a total number of pixel points within the closed contour based on the Cartesian coordinate system as described in block S141.

In one embodiment, referring to the description in block S141, if an area enclosed by multiple passengers is small (for example, is less than the area threshold), when a new passenger enters the compartment, the multiple passengers may not move or may move together, and making the enclosed area is impossible to accept the new passenger. Therefore, when the area of the enclosing area is smaller than the preset area threshold, the electronic device updates the enclosing area to be an occupied area.

In an embodiment, the area threshold may be set according to the total areas of a plurality of occupied areas occupied by human bodies, and may be set to be one-third or one-half of the total areas of the plurality of occupied areas occupied by human bodies. For example, an average area of the plurality of circular occupied areas in FIG. 4 includes 300 pixel points, then the area threshold can be set to one-third of the average area, for example, it can be set as: 300×⅓, that is, the area threshold is set to 100 pixel points.

Figure 9:
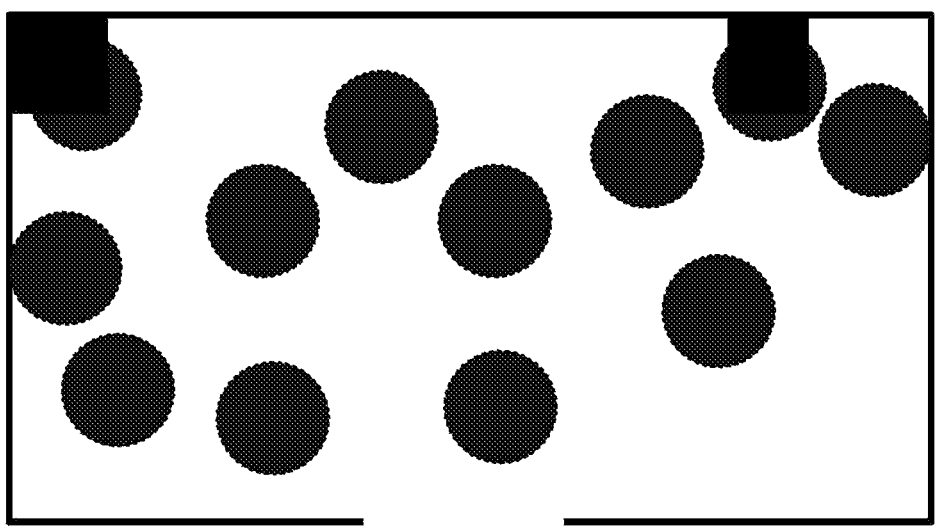
FIG. 9 is a diagram of a second example of updating an occupied area provided by an embodiment of the present application.

In an embodiment, as shown in FIG. 9, it is a second example diagram for updating an occupied area provided in the embodiment of the present application. On the basis of FIG. 8, the updated occupied area is shown in the upper left corner of FIG. 9.

In one embodiment, after updating the occupied area according to the above process, the electronic device takes the area outside the occupied areas as the target blank area.

Block S15, the electronic device determines a total area of the target blank area as the remaining carrying space.

In one embodiment, the electronic device determines a total number of pixel points included in the target blank area as the total area of the target blank area. In another embodiment, the electronic device obtains the total area of the target blank area by subtracting the area of the plurality of occupied areas from an area of the passenger distribution image.

Block S2, the electronic device determines a predicted remaining number of passengers that can be carried in the compartment according to the remaining carrying space.

In one embodiment, the electronic device sets the predicted remaining number of passengers being proportional to an area of the remaining carrying space.

Specifically, it is assumed that the electronic device determines that the area of the remaining carrying space is S (for example, 15,000 pixel points) at block S1, and determines a number of passengers that can be accommodated per a square meter is p (for example, 5 passengers), and determines that a number of pixel points corresponding to one square meter in the passenger distribution image equals N (for example, 1500), so the N pixel points in the passenger distribution image can carry p passengers, then the electronic device obtains the predicted remaining number of passengers that can be carried according to a formula: Pimage=(S×p)/N (for example, (15000×5)/1500=50). Pimage represents the predicted remaining number of passengers that can be carried In other embodiments, in addition to the above-mentioned method of representing the distance and the area by using the number of pixel points, the electronic device can obtain a first ratio of a length of the passenger distribution image to an actual length of the compartment, and obtain a second ratio of a width of the passenger distribution image to a width of the compartment; the electronic device then can obtain an actual distance corresponding to a distance calculated based on the passenger distribution image according to the first ratio and the second ratio, and can obtain an actual area corresponding to an area calculated based on the passenger distribution image according to the first ratio and the second ratio.

Block S3, the electronic device determines a recommended remaining number of passengers that can be carried in the compartment based on a number of passengers currently in the compartment, the predicted remaining number of passengers, and a maximum number of passengers that can be carried in the compartment.

In one embodiment, the predicted remaining number of passengers that can be carried obtained at block S2 is a value estimated based on the passenger distribution image. Since the passenger distribution image has been processed multiple times at block S1, the predicted remaining number of passengers that can be carried is not a correct value and cannot be used as a recommended remaining number of passengers. Therefore, at block S3, the electronic device needs to further process the predicted remaining number of passengers that can be carried to obtain the recommended remaining number of passengers that can be carried. For example, the recommended remaining number of passengers can be obtained through a preset ratio, which can be 50%, refer to the example below.

In one embodiment, the electronic device determines the recommended remaining number of passengers that can be carried in the compartment according to a formula: N1=(N2−N3+N4)/2. N1 represents the recommended remaining number of passengers, N2 represents the maximum number of passengers that can be carried in the compartment, N3 represents the number of passengers currently in the compartment, and N4 represents the predicted remaining number of passengers that can be carried in the compartment.

In one embodiment, the electronic device detects a number of passengers getting on the compartment at each station and detects a number of passengers getting off the compartment at each station, and determining the number of passengers currently in the compartment according to the number of passengers getting on the compartment and the number of passengers getting off the compartment at each station.

In one embodiment, each compartment is also equipped with an object movement sensor or a human body sensor for detecting a human body. Specifically, the human body sensor may include an infrared sensor, and the infrared sensor may be installed at a position of the door of the compartment (such as at a frame around the door) to detect the number of passengers getting on the compartment at each station, and detecting the number of passengers getting off compartment at each station, so as to determine the number of passengers currently in the compartment according to the number of passengers getting on the compartment and the number of passengers getting off the compartment.

Specifically, starting from an original station of the vehicle, the electronic device detects the number of passengers getting on the compartment and detects the number of passengers getting off the compartment at each station, and adding up the number of passengers getting on the compartment and subtracting the number of passengers getting off the compartment at each station except the original station, thereafter, the electronic device obtains the number of passengers currently in the compartment (for example, 40).

In one embodiment, the maximum number of passengers that can be accommodated in the compartment is known data and is provided by a manufacturer of the compartment, for example, the maximum number of passengers that can be accommodated is 101.

In one embodiment, an ideal remaining number of passengers in the compartment can be obtained by subtracting the number of passengers currently in the compartment from the maximum number of passengers of the compartment, but referring to the block of updating the occupied area at block S1, due to various reasons, the compartment cannot continue to carry the ideal remaining number of passengers. In other embodiments, the electronic device can set a value between the predicted remaining number of passengers and the ideal remaining number of passengers as the recommended remaining number of passengers, so that can be carried in the compartment as many passengers as possible, and it can also ensure that the compartment will not be overloaded.

In an embodiment, the recommended remaining number of passengers may not be an integer, and in this case, the electronic device can round up or down the recommended remaining number of passengers to obtain an integer value. For example, the recommended remaining number of passengers=(the maximum number of passengers in the compartment−the number of passengers currently in the compartment+the predicted remaining number of compartment)/2=(101−40+50)/2=55.5, the electronic device can round 55.5 down, and obtain the recommended remaining number of passengers 55.

Block S4, the electronic device determines the degree of congestion of the compartment according to the recommended remaining number of passengers that can be carried in the compartment and the maximum number of passengers that can be carried in the compartment.

In one embodiment, the electronic device determines the degree of congestion of the compartment according to the recommended remaining number of passengers that can be carried and the maximum number of passengers that can be carried by: setting the degree of congestion=1−the recommended remaining number of passengers/the maximum number of passengers.

In one embodiment, the degree of congestion indicates a degree of congestion of passengers in the compartment, and the higher the degree of congestion is, the more passengers there are in the compartment, the fewer new passengers can be accommodated, and the less it is recommended for new passengers to board. For example, the degree of congestion=55/110=0.5.

In one embodiment, the electronic device further displays the recommended remaining number of passengers that can be carried in the compartment and displays the degree of congestion for passengers waiting at each station.

In one embodiment, the recommended remaining number of passengers that each compartment can carry and the degree of congestion of each compartment are sent to a terminal platform associated with the vehicle through a network. For example, the terminal platform can be an application software or a small program or a website in a mobile phone, or a display device installed at the station, etc. Thus, before the vehicle arrives at the station, the passengers waiting at the station can be shown the recommended remaining number of passengers and the degree of congestion of each compartment, so that passengers can know a loading status of each compartment and choose a compartment with a lower degree of congestion to wait in line to avoid failed rides.

In one embodiment, each compartment may also be equipped with a display device, such as a monitor, the electronic device can control the display device to display the passenger distribution image. Specifically, the display device may be installed outside the door of the compartment, so that waiting passengers can determine a location of the target blank area of the compartment according to the passenger distribution image.

In one embodiment, the method for determining the degree of congestion of the compartment provided by the present application determines the remaining carrying space of the compartment according to the passenger distribution image of the compartment, and determines the recommended remaining number of passengers of each compartment according to the remaining carrying space of each compartment, the number of passengers already/currently carried in each compartment, and the maximum number of passengers of each compartment; and determines the degree of congestion of each compartment, so as to recommend passengers with less crowded compartment to save passengers' waiting time.

FIG. 1 describes in detail the method of determining the degree of congestion of the compartment of the present disclosure. Hardware architecture that implements the method of determining the degree of congestion of the compartment is described in conjunction with FIG. 10.

It should be understood that the described embodiments are for illustrative purposes only, and are not limited by this structure in the scope of the claims.

FIG. 10 is a block diagram of an electronic device provided by the present disclosure. The electronic device 3 may include a storage device 31 and at least one processor 32. It should be understood by those skilled in the art that the structure of the electronic device 3 shown in FIG. 10 does not constitute a limitation of the embodiment of the present disclosure. The electronic device 3 may further include other hardware or software, or the electronic device 3 may have different component arrangements. In one embodiment, the electronic device may further include an infrared imaging device. In other embodiments, the infrared imaging device may be communicated with the electronic device and independent of the electronic device. The infrared imaging device can be used to obtain infrared thermal images.

In at least one embodiment, the electronic device 3 may include a terminal that is capable of automatically performing numerical calculations and/or information processing in accordance with pre-set or stored instructions. The hardware of terminal can include, but is not limited to, a microprocessor, an application specific integrated circuit, programmable gate arrays, digital processors, and embedded devices.

It should be noted that the electronic device 3 is merely an example, and other existing or future electronic products may be included in the scope of the present disclosure, and are included in the reference.

In some embodiments, the storage device 31 can be used to store program codes of computer readable programs and various data, such as a determination system 30 installed in the electronic device 3, and automatically access the programs or data with high speed during the running of the electronic device 3. The storage device 31 can include a read-only memory (ROM), a random access memory (RAM), a programmable read-only memory (PROM), an erasable programmable read only memory (EPROM), an one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the electronic device 3 that can be used to carry or store data.

In some embodiments, the at least one processor 32 may be composed of an integrated circuit, for example, may be composed of a single packaged integrated circuit, or multiple integrated circuits of same function or different functions. The at least one processor 32 can include one or more central processing units (CPU), a microprocessor, a digital processing chip, a graphics processor, and various control chips. The at least one processor 32 is a control unit of the electronic device 3, which connects various components of the electronic device 3 using various interfaces and lines. By running or executing a computer program or modules stored in the storage device 31, and by invoking the data stored in the storage device 31, the at least one processor 32 can perform various functions of the electronic device 3 and process data of the electronic device 3. For example, the processor 32 may perform the function of determining the degree of congestion of the compartment shown in FIG. 1.

In some embodiments, the determination system 30 operates in electronic device 3. The determination system 30 may include a plurality of functional modules composed of program code segments. The program code of each program segment in the determination system 30 can be stored in storage device 31 of the electronic device 3 and executed by at least one processor 32 to achieve blocks as shown in FIG. 1.

In this embodiment, the determination system 30 can be divided into a plurality of functional modules. The module means a series of computer program segments that can be executed by at least one processor 32 and perform fixed functions and are stored in storage device 31.

The program codes are stored in storage device 31 and at least one processor 32 may invoke the program codes stored in storage device 31 to perform the related function. The program codes stored in the storage device 31 can be executed by at least one processor 32, so as to realize the function of each module to achieve the purpose of determining the degree of congestion of the compartment as shown in FIG. 1.

In one embodiment of this application, said storage device 31 stores at least one instruction, and said at least one instruction is executed by said at least one processor 32 for the purpose of determining the degree of congestion of the compartment as shown in FIG. 1.

Although not shown, the electronic device 3 may further include a power supply (such as a battery) for powering various components. Preferably, the power supply may be logically connected to the at least one processor 32 through a power management device, thereby, the power management device manages functions such as charging, discharging, and power management. The power supply may include one or more DC or AC power sources, a recharging device, a power failure detection circuit, a power converter or inverter, a power status indicator, and the like. The electronic device 3 may further include various sensors, such as a BLUETOOTH module, a WI-FI module, and the like, and details are not described herein.

In the several embodiments provided in this disclosure, it should be understood that the devices and methods disclosed can be implemented by other means. For example, the device embodiments described above are only schematic. For example, the division of the modules is only a logical function division, which can be implemented in another way.

The modules described as separate parts may or may not be physically separate, and the parts displayed as modules may or may not be physical units, that is, may be located in one place, or may be distributed over multiple network units.

Part or all of the modules can be selected according to the actual needs to achieve the purpose of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A method for determining a degree of congestion of a compartment applied to an electronic device, the method comprising:
    obtaining a binarized passenger distribution image by performing a binarization processing on a passenger distribution image of the compartment, comprising:
    setting a pixel value of each of pixel points in each of a plurality of first areas in the passenger distribution image to be a first pixel value, a temperature value of each of the plurality of first areas being greater than or equal to a preset temperature threshold; and setting a pixel value of each of pixel points in each of a plurality of second areas in the passenger distribution image to be a second pixel value, a temperature value of each of the plurality of second areas being less than the preset temperature threshold;
    determining a remaining carrying space of the compartment according to the binarized passenger distribution image, comprising: determining a plurality of occupied areas by taking each area corresponding to the first pixel value in the passenger distribution image as an occupied area, and taking an area corresponding to the second pixel value in the passenger distribution image as a blank area; obtaining a target blank area outside the plurality of occupied areas by updating the plurality of occupied areas; and determining a total area of the target blank area as the remaining carrying space;
    determining a predicted remaining number of passengers that can be carried in the compartment according to the remaining carrying space;
    determining a recommended remaining number of passengers that can be carried in the compartment based on a number of passengers currently in the compartment, the predicted remaining number of passengers, and a maximum number of passengers that can be carried in the compartment; and
    determining the degree of congestion of the compartment according to the recommended remaining number of passengers that can be carried in the compartment and the maximum number of passengers that can be carried in the compartment.

2. The method according to claim 1, wherein the passenger distribution image of the compartment is an infrared thermal image.

3. The method according to claim 2, wherein the performing of the binarization processing on the passenger distribution image of the compartment further comprises:
    setting a pixel value of each of pixel points at a wall panel of the compartment in the passenger distribution image to the first pixel value, and setting a pixel value of each of pixel points at a door of the compartment in the passenger distribution image to the second pixel value.

4. The method according to claim 3, wherein the updating of the plurality of occupied areas comprises:
    determining a distance between the wall panel of the compartment and any one occupied area of the plurality of occupied areas except an area corresponding to the wall panel;
    in response that the distance is less than a preset distance threshold, updating an area between the any one occupied area and the wall panel of the compartment to be an occupied area;
    determining an enclosing area surrounded by one or more occupied areas, and updating the enclosing area to be an occupied area when an area of the enclosing area is smaller than a preset area threshold.

5. The method according to claim 1, wherein the determining of the predicted remaining number of passengers that can be carried in the compartment according to the remaining carrying space comprises:
    setting the predicted remaining number of passengers being proportional to the remaining carrying space
    wherein the determining of the recommended remaining number of passengers that can be carried in the compartment is performed according to a formula: $N1=(N2-N3+N4)/2$, wherein, $N1$ represents the recommended remaining number of passengers, $N2$ represents the maximum number of passengers that can be carried in the compartment, $N3$ represents the number of passengers currently in the compartment, and $N4$ represents the predicted remaining number of passengers that can be carried in the compartment.

6. The method according to claim 1, further comprising:
    detecting a number of passengers getting on the compartment at each station and detecting a number of passengers getting off the compartment at each station; and
    determining the number of passengers currently in the compartment according to the number of passengers getting on the compartment and the number of passengers getting off the compartment at each station.

7. The method according to claim 1, further comprising:
    displaying the recommended remaining number of passengers that can be carried in the compartment and displaying the degree of congestion.

8. An electronic device comprising:
a storage device;
at least one processor; and
the storage device storing one or more programs, which when executed by the at least one processor, cause the at least one processor to:
obtain a binarized passenger distribution image by performing a binarization processing on a passenger distribution image of the compartment, comprising: setting a pixel value of each of pixel points in each of a plurality of first areas in the passenger distribution image to be a first pixel value, a temperature value of each of the plurality of first areas being greater than or equal to a preset temperature threshold; and setting a pixel value of each of pixel points in each of a plurality of second areas in the passenger distribution image to be a second pixel value, a temperature value of each of the plurality of second areas being less than the preset temperature threshold;
determine a remaining carrying space of the compartment according to the binarized passenger distribution image, comprising: determining a plurality of occupied areas by taking each area corresponding to the first pixel value in the passenger distribution image as an occupied area, and taking an area corresponding to the second pixel value in the passenger distribution image as a blank area; obtaining a target blank area outside the plurality of occupied areas by updating the plurality of occupied areas; and determining a total area of the target blank area as the remaining carrying space;
determine a predicted remaining number of passengers that can be carried in the compartment according to the remaining carrying space;
determine a recommended remaining number of passengers that can be carried in the compartment based on a number of passengers currently in the compartment, the predicted remaining number of passengers, and a maximum number of passengers that can be carried in the compartment; and
determine the degree of congestion of the compartment according to the recommended remaining number of passengers that can be carried in the compartment and the maximum number of passengers that can be carried in the compartment.

9. The electronic device according to claim 8, wherein the passenger distribution image of the compartment is an infrared thermal image.

10. The electronic device according to claim 9, wherein the at least one processor performs the binarization processing on the passenger distribution image of the compartment further by:
setting a pixel value of each of pixel points at a wall panel of the compartment in the passenger distribution image to the first pixel value, and setting a pixel value of each of pixel points at a door of the compartment in the passenger distribution image to the second pixel value.

11. The electronic device according to claim 10, wherein the at least one processor updates the plurality of occupied areas by:
determining a distance between the wall panel of the compartment and any one occupied area of the plurality of occupied areas except an area corresponding to the wall panel;
in response that the distance is less than a preset distance threshold, updating an area between the any one occupied area and the wall panel of the compartment to be an occupied area;
determining an enclosing area surrounded by one or more occupied areas, and updating the enclosing area to be an occupied area when an area of the enclosing area is smaller than a preset area threshold.

12. The electronic device according to claim 8, wherein the at least one processor determines the predicted remaining number of passengers that can be carried in the compartment according to the remaining carrying space by:
setting the predicted remaining number of passengers being proportional to the remaining carrying space
wherein the determining of the recommended remaining number of passengers that can be carried in the compartment is performed according to a formula: $N1=(N2-N3+N4)/2$, wherein, $N1$ represents the recommended remaining number of passengers, $N2$ represents the maximum number of passengers that can be carried in the compartment, $N3$ represents the number of passengers currently in the compartment, and $N4$ represents the predicted remaining number of passengers that can be carried in the compartment.

13. The electronic device according to claim 8, wherein the at least one processor is further caused to:
detect a number of passengers getting on the compartment at each station and detect a number of passengers getting off the compartment at each station; and
determine the number of passengers currently in the compartment according to the number of passengers getting on the compartment and the number of passengers getting off the compartment at each station.

14. The electronic device according to claim 8, wherein the at least one processor is further caused to:
display the recommended remaining number of passengers that can be carried in the compartment and displaying the degree of congestion.

15. A non-transitory storage medium having instructions stored thereon, when the instructions are executed by a processor of an electronic device, the processor is caused to perform a method of determining a degree of congestion of a compartment, wherein the method comprises:
obtaining a binarized passenger distribution image by performing a binarization processing on a passenger distribution image of the compartment, comprising: setting a pixel value of each of pixel points in each of a plurality of first areas in the passenger distribution image to be a first pixel value, a temperature value of each of the plurality of first areas being greater than or equal to a preset temperature threshold; and setting a pixel value of each of pixel points in each of a plurality of second areas in the passenger distribution image to be a second pixel value, a temperature value of each of the plurality of second areas being less than the preset temperature threshold;
determining a remaining carrying space of the compartment according to the binarized passenger distribution image, comprising: determining a plurality of occupied areas by taking each area corresponding to the first pixel value in the passenger distribution image as an occupied area, and taking an area corresponding to the second pixel value in the passenger distribution image as a blank area; obtaining a target blank area outside the plurality of occupied areas by updating the plurality of occupied areas; and determining a total area of the target blank area as the remaining carrying space;
determining a predicted remaining number of passengers that can be carried in the compartment according to the remaining carrying space;

determining a recommended remaining number of passengers that can be carried in the compartment based on a number of passengers currently in the compartment, the predicted remaining number of passengers, and a maximum number of passengers that can be carried in the compartment; and determining the degree of congestion of the compartment according to the recommended remaining number of passengers that can be carried in the compartment and the maximum number of passengers that can be carried in the compartment.

16. The non-transitory storage medium according to claim 15, wherein the passenger distribution image of the compartment is an infrared thermal image.

17. The non-transitory storage medium according to claim 16, wherein the performing of the binarization processing on the passenger distribution image of the compartment further comprises:

setting a pixel value of each of pixel points at a wall panel of the compartment in the passenger distribution image to the first pixel value, and setting a pixel value of each of pixel points at a door of the compartment in the passenger distribution image to the second pixel value.

\* \* \* \* \*